United States Patent [19]

Brandenstein et al.

[11] Patent Number: 4,563,099
[45] Date of Patent: Jan. 7, 1986

[54] ROLLING BEARING UNIT

[75] Inventors: Manfred Brandenstein, Eussenheim; Roland Haas, Hofheim; Rüdiger Hans, Niederwerrn, all of Fed. Rep. of Germany

[73] Assignee: SKF Kugellagerfabriken GmbH, Schweinfurt, Fed. Rep. of Germany

[21] Appl. No.: 598,883

[22] Filed: Apr. 10, 1984

[30] Foreign Application Priority Data

Apr. 15, 1983 [DE] Fed. Rep. of Germany ... 8311154[U]

[51] Int. Cl.⁴ .......................... F16C 9/02; F16C 23/06
[52] U.S. Cl. ..................................... 384/458; 384/489; 384/515; 384/519; 384/537; 384/903
[58] Field of Search ............... 384/448, 489, 458, 510, 384/513, 515, 519, 537, 545, 561, 562, 585, 617, 615, 620, 903

[56] References Cited

U.S. PATENT DOCUMENTS

| 878,652 | 2/1908 | Matthews | 384/510 |
|---|---|---|---|
| 3,294,141 | 12/1966 | Schotthoefer et al. | 384/562 X |
| 4,089,540 | 5/1978 | Liljequist | 384/545 X |
| 4,364,615 | 12/1982 | Euler | 384/903 X |

FOREIGN PATENT DOCUMENTS 1905385 11/1964 Fed. Rep. of Germany .
1234558 2/1967 Fed. Rep. of Germany ...... 384/489

Primary Examiner—Donald Watkins
Assistant Examiner—David Werner
Attorney, Agent, or Firm—Daniel M. Rosen

[57] ABSTRACT

A rolling bearing unit, in particular a play-adjustable bearing arrangement, comprising a bearing shaft, a housing having a bore, and angular contact ball bearings having outer rings arranged in the housing bore and inner rings arranged on the bearing shaft. The shaft is provided with three annular grooves, a threaded portion, and an axial groove along the threaded portion. A locking ring is arranged in the first annular groove, a first cover is arranged on the shaft and abuts the locking ring, and the inner ring of the first bearing abuts the cover. The adjustment of the bearing play is achieved by adjustably arranging a second cover on the threaded portion of the shaft to abut the inner ring of the other ball bearing. The securing of the second cover against rotation relative to the shaft is achieved by deforming or indenting the boss of the cover to engage the axial groove. The outer rings of the bearings are L-shaped and a pair of slotted rings are arranged in the second and third annular grooves of the shaft, between and near the flanges. The slotted rings prevent the balls of the bearings from falling out during shipment and before assembly in a housing.

3 Claims, 2 Drawing Figures

ROLLING BEARING UNIT

BACKGROUND OF THE INVENTION

The invention relates to a rolling bearing unit, in particular to a play-adjustable bearing arrangement of a pedal bearing shaft, comprising two angular contact ball bearings spaced apart from each other, the outer rings of which are fixed in the bore of a housing in the axial direction and the inner rings of which are arranged on the shaft.

A bearing arrangement of this type for pedal bearing shafts is disclosed, for example, in DE-GM No. 1905385. According to this known bearing arrangement both the inner rings as well as the shaft are provided with threaded portions, so that the manufacture of these components is relatively expensive. In addition, the outer rings are provided with radially outwardly directed flanges, so that the bearing components and the shaft must be separately assembled. The assembly of this bearing is consequently complicated and time-consuming and difficult to effect solely by automation.

SUMMARY OF THE INVENTION

The present invention is therefore directed to providing a solution to the problem of providing a rolling bearing unit of the previously known type, which is comprised of simply manufactured parts that can be supplied as a unit by the manufacturer and assembled by automatic devices.

In accordance with the invention, this problem is solved by providing a rolling bearing unit of the previously known type, wherein the outer rings have a known L-shaped form and are provided with radially inwardly disposed flanges facing one another, and wherein the rings connected to the shaft or the like are arranged between the flanges of both angular contact ball bearings, in proximity to the flanges.

According to a preferred embodiment of the present invention, slotted spring rings are arranged in annular grooves of the outer rings, these spring rings abutting conical surfaces of the housing. In this way advantageous centering of the bearing components and bracing of the outer rings by the housing are achieved.

According to a further preferred embodiment of the invention, a cover on one side of the housing is rigidly connected to the shaft. Another cover on the other side of the housing is screwed on a threaded portion of the shaft, so that a simple adjustment of the bearing is made possible by the latter cover and advantageous sealing of the bearing arrangement is achieved.

BRIEF DESCRIPTION OF THE DRAWINGS

In order that the invention may be more clearly understood, it will now be disclosed in greater detail with reference to the accompanying drawings wherein.

DETAILED DESCRIPTION OF THE PREFERRED EMBODIMENT

Figure 2:
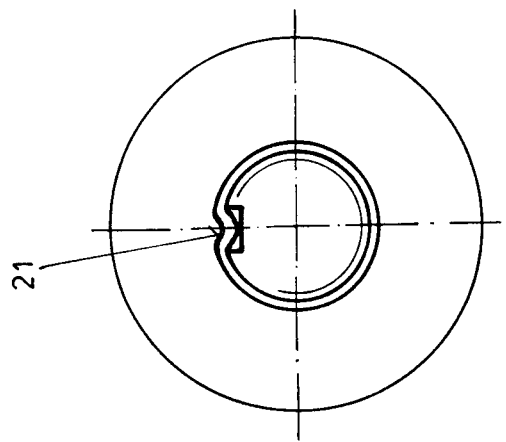
FIG. 2 shows a side view from the right of the rolling bearing unit shown in FIG. 1.
Figure 1:
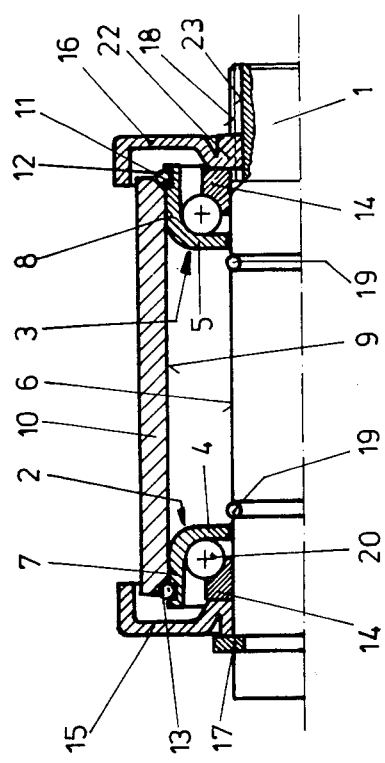
FIG. 1 shows a play-adjustable rolling bearing unit according to the invention in axial section.

The rolling bearing unit shown in FIG. 1 is comprised of two angular contact ball bearings and a shaft 1. The outer rings 2, 3 of the angular contact ball bearings are made of sheet metal and have an L-shaped cross section. The radially inwardly directed flanges 4, 5 are on the sides of the outer rings that face each other, and extend close to the outer surface 6 of the shaft 1. The axially outwardly directed portions 7, 8 of outer rings 2, 3 are inserted in the bore 9 of a housing 10 and are each held in one axial direction by a separate slotted spring ring 12 of round cross section inserted in an annular groove 11 formed in the outer surface of the respective outer rings 2, 3. The spring rings 12 abut conical surfaces 13 of the housing 10. The solid inner rings 14 of the angular contact ball bearings are arranged on the shaft 1 and abut covers 15, 16, which are fastened to the shaft 1 by a locking ring 17 (on the left side of the drawing) and by a thread 18 (on the right side of the drawing). The shaft 1 is provided with the oppositely mounted bearings and covers 15, 16, and slotted rings 19 are provided on the shaft 1 between the bearings. The rings 19 are mounted a short distance from the radially inwardly directed flanges 4, 5 of the outer rings 2, 3 to prevent the balls 20 (held between the races of the inner rings 14 and the outer rings 2, 3 without a cage) from falling out during shipment. The provision of rings 19 is necessitated because the rolling bearing unit may be shipped from the manufacturer without housing 10, in which the rolling bearing unit is to be inserted. Before assembly of the rolling bearing unit, for example, to form a pedal, the spring ring 12 is taken out of the annular groove 11 of the outer ring 3 (on the right side of the drawing) and the cover 16 is unscrewed from the shaft 1. Then the oppositely mounted pedal bearing unit is inserted in the bore 9 of housing 10 (on the left side of the drawing) and the spring ring 12 is again inserted in the annular groove 11. The adjustment of the bearing play is achieved by means of the cover 16, which is screwed a suitable distance onto the threaded portion 18 of shaft 1. The securing of the cover 16 against rotation is achieved, for example, by means of radial fullering 21 of the boss 22, i.e., by deforming or indenting the boss to engage the axially disposed groove 23 of shaft 1. The covers 15, 16 enclose the housing 10 with close clearance, so that the bearing arrangement is sealed against dirt and spray water.

The above-disclosed embodiment represents only one example of the rolling bearing arrangement of the present invention. Modifications may be made in the structure which are within the scope of the invention. Thus, for example, slotted spring rings can be used for transport reliability, the rings being arranged with prestress directly on the outer surface 6 of shaft 1. Further, it is possible to use plastic rings for transport reliability which push on the shaft with prestress.

We claim:

1. A rolling bearing unit comprising a bearing shaft having a threaded portion, first through third annular grooves, and an axial groove along said threaded portion, a housing having a bore, first and second angular contact ball bearings, each of said bearings having an inner ring arranged on said shaft and an L-shaped outer ring inserted at the respective end of said bore, a locking ring arranged in said first annular groove of said shaft, and first and second covers each having a boss, wherein said first cover is arranged on said shaft and abuts said locking ring, said inner ring of said first bearing abuts said first cover, and said second cover is adjustably arranged on said threaded portion and abuts said inner ring of said second bearing, said second cover being locked on said shaft by means of an indentation formed in the boss of said second cover to engage said axial groove of said shaft.

2. The rolling bearing unit of claim 1, further comprising a pair of slotted rings arranged in said second and third annular grooves of said shaft, wherein said outer rings of said bearings have mutually confronting, radially inwardly disposed flanges, and said second and third annular grooves are arranged on said shaft between and in proximity to said flanges respectively.

3. The rolling bearing unit of claim 2, further comprising a pair of spring rings, wherein said spring rings are respectively arranged in annular grooves formed in said outer rings and abutting conical surfaces formed in said housing.

* * * * *